US011000443B2

(12) United States Patent
Gallagher

(10) Patent No.: US 11,000,443 B2
(45) Date of Patent: May 11, 2021

(54) PORTABLE THERAPEUTIC MAT WITH THERMOCHROMIC PROPERTIES

(71) Applicant: SweetCheeks Products, Inc., Austin, TX (US)

(72) Inventor: Ali Gallagher, Austin, TX (US)

(73) Assignee: SANKO TEKSTIL ISLETMELERI SAN. VE TIC. A.S., Inegol-Bursa (TR)

( * ) Notice: Subject to any disclaimer, the term of this patent is extended or adjusted under 35 U.S.C. 154(b) by 477 days.

(21) Appl. No.: 15/927,251

(22) Filed: Mar. 21, 2018

(65) Prior Publication Data
US 2018/0207052 A1 Jul. 26, 2018

Related U.S. Application Data

(63) Continuation-in-part of application No. 14/081,528, filed on Nov. 15, 2013, now Pat. No. 9,931,267.
(Continued)

(51) Int. Cl.
A61H 7/00 (2006.01)
B32B 17/10 (2006.01)
A47G 27/02 (2006.01)

(52) U.S. Cl.
CPC ....... A61H 7/001 (2013.01); B32B 17/10477 (2013.01); A47G 27/0212 (2013.01);
(Continued)

(58) Field of Classification Search
CPC .... A61B 17/1325; A61H 39/04; A61H 7/001; A61H 2201/1695; A61H 2201/1633;
(Continued)

(56) References Cited

U.S. PATENT DOCUMENTS 1,904,039 A 4/1933 Bruder
2,156,629 A 5/1939 Hutchison
(Continued)

FOREIGN PATENT DOCUMENTS

CN 201088697 7/2008
JP 2004-329666 11/2004
(Continued)

OTHER PUBLICATIONS

Examination report dated Feb. 2, 2018 for Australian Patent Application No. 2013348209.
(Continued)

Primary Examiner — Katherine M Rodjom
(74) Attorney, Agent, or Firm — Silvia Salvadori

(57) ABSTRACT

A portable therapeutic massage mat includes a base and a plurality of protrusions extending from the base. The protrusions may have a square pyramidal shape or other suitable shapes. The plurality of protrusions, the base, or the entire massage mat may be formed of a material that includes at least one thermochromic pigment. The material that includes the thermochromic pigment may be a thermoplastic elastomer. When a user sits or rests upon the portable massage mat for a time, local blood flow increases causing a rise in local body temperature which is exhibited by a color change of the portable massage mat, due to the thermochromic pigment. The increased local blood flow provides beneficial therapeutic effects such as reducing the appearance of cellulite, relieving minor aches and pain, and relieving minor muscle spasms.

18 Claims, 7 Drawing Sheets

Related U.S. Application Data

(60) Provisional application No. 61/728,468, filed on Nov. 20, 2012.

(52) U.S. Cl.
CPC ............. *A61H 2201/0157* (2013.01); *A61H 2201/1633* (2013.01); *A61H 2201/1695* (2013.01); *A61H 2203/0425* (2013.01); *A61H 2205/083* (2013.01); *A61H 2205/086* (2013.01); *A61H 2230/505* (2013.01)

(58) Field of Classification Search
CPC .... A61H 2201/0157; A61H 2203/0425; A61H 2205/086; A32B 17/10477; A47G 27/0212
See application file for complete search history.

(56) References Cited

U.S. PATENT DOCUMENTS

| | | |
|---|---|---|
| 3,744,483 A | 7/1973 | Picolin |
| 3,970,078 A | 7/1976 | Rogers, Jr. |
| 4,086,922 A | 5/1978 | Henderson |
| D256,841 S | 7/1980 | Corbett |
| 4,421,110 A * | 12/1983 | DeLisle ............. A61H 7/001 601/134 |
| 4,614,000 A | 9/1986 | Mayer |
| 4,673,605 A | 6/1987 | Sias et al. |
| D294,212 S | 2/1988 | Sias et al. |
| 48,299,987 | 5/1989 | Stewart |
| 5,052,068 A | 10/1991 | Graebe |
| 5,134,735 A | 8/1992 | Rose |
| 5,170,778 A | 12/1992 | Jamis |
| 5,250,067 A | 10/1993 | Gelfer et al. |
| 5,402,545 A | 4/1995 | Jolley |
| D361,132 S | 8/1995 | Lee |
| D369,414 S | 4/1996 | Lee |
| 5,628,079 A | 5/1997 | Kizemchuck et al. |
| 5,639,145 A | 6/1997 | Alderman |
| 5,820,573 A | 10/1998 | Ramos |
| 5,938,684 A | 8/1999 | Lynch |
| 6,153,207 A | 11/2000 | Pugliese |
| 6,443,914 B1 | 9/2002 | Costantino |
| 6,511,445 B2 | 1/2003 | Sivan et al. |
| 6,517,499 B1 | 2/2003 | Pereira |
| 6,969,548 B1 | 11/2005 | Goldfine |
| 6,979,300 B1 | 12/2005 | Julian |
| 6,988,979 B1 | 1/2006 | Trainor |
| 7,520,003 B2 * | 4/2009 | Meyers ............. A47K 3/002 4/583 |
| D693,934 S | 11/2013 | Lin |
| 8,677,532 B2 | 3/2014 | Legare |
| 2002/0111574 A1 | 8/2002 | Robbins, III et al. |
| 2004/0082890 A1 | 4/2004 | Kuo |
| 2006/0004308 A1 | 1/2006 | Yamauchi |
| 2006/0235345 A1 | 10/2006 | Ivanov |
| 2006/0276731 A1 | 12/2006 | Thiebaut et al. |
| 2007/0093867 A1 * | 4/2007 | Savoia ............. A61H 39/04 606/204 |
| 2008/0255599 A1 | 10/2008 | Idea et al. |
| 2008/0262579 A1 * | 10/2008 | Berk ............. A61F 7/007 607/104 |
| 2009/0209889 A1 | 8/2009 | Li |
| 2010/0161014 A1 | 6/2010 | Lynch et al. |
| 2010/0175275 A1 | 7/2010 | Bieruti |
| 2015/0251045 A1 * | 9/2015 | Hing ............. B32B 37/12 5/417 |

FOREIGN PATENT DOCUMENTS

| | | |
|---|---|---|
| JP | 200528063 | 2/2005 |
| JP | 2005028063 | 2/2005 |
| JP | 2008259552 | 10/2008 |
| JP | 3178195 | 9/2012 |
| WO | 2010141978 | 12/2010 |

OTHER PUBLICATIONS

Office Action dated Apr. 10, 2018 for JP application No. 2015-542831.
Office Action dated Dec. 13, 2017 for CN Patent Application No. 201380060652.8.
Chinese Office Action dated May 27 2016 in Chinese Application No. 201380060652.8.
English translation of Chinese Office Action dated May 27, 2016 in Chinese Application No. 201380060652.8.
Supplementary European Search Report dated Jun. 21, 2016 for European patent application No. 13857389.
International Search Report and Written Opinion issued for PCT Application No. PCT/US2013/070348 dated Jan. 22, 2014, 8 pages.
Notice of Allowance issued for corresponding European application No. 13 857 389.4.
Eglish translation of an official action dated Jan. 31, 2018 for corresponding Eurasian patent application No. 201590970 / 31.
Office Action dated Sep. 14, 2018 for corresponding Eurasian application No. 201590970 / 31.
Cover letter dated Aug. 24, 2018 from JP local agent reporting a Decision of Rejection and a Decision to Dismissal of Amendment for corresponding JP applocation No. 2015-542831.
Decision of Rejection dated Aug. 21, 2018 or corresponding JP application No. 2015-542831.
Decision to Dismissal of Amendment dated Aug. 21, 2018 for corresponding JP application No. 2015-542831.

* cited by examiner

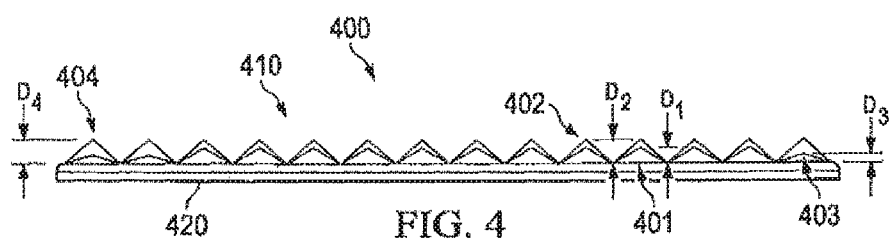
FIG. 4
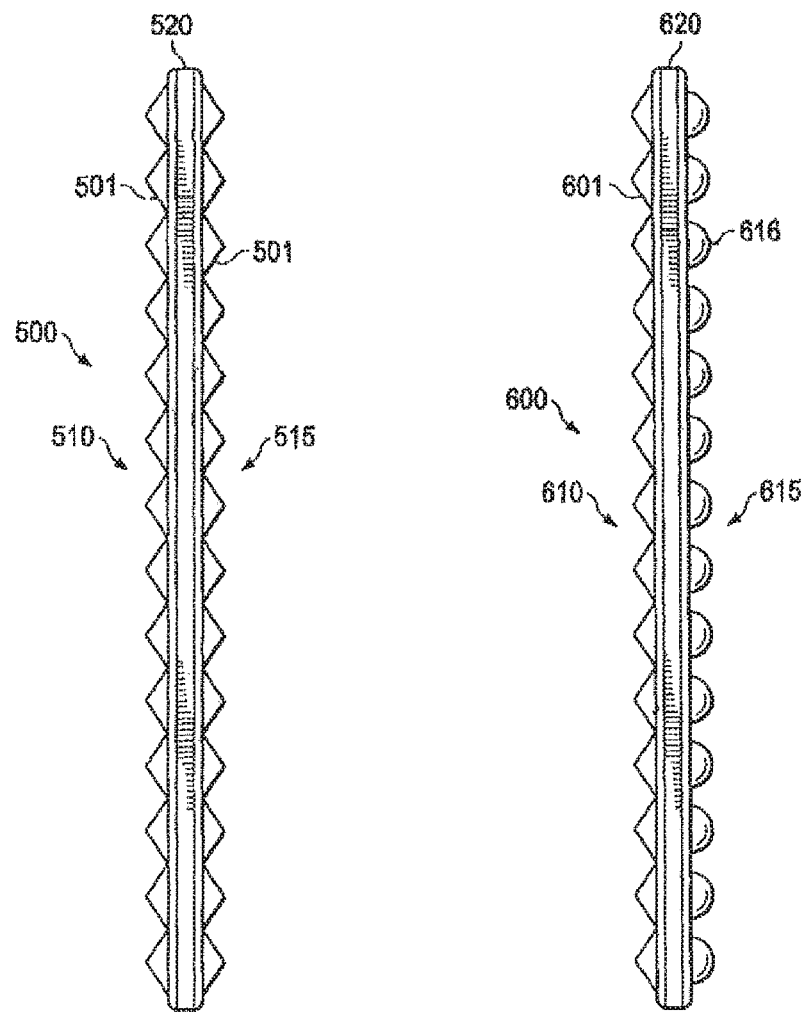
FIG. 5
FIG. 6

PORTABLE THERAPEUTIC MAT WITH THERMOCHROMIC PROPERTIES

CROSS-REFERENCE TO RELATED APPLICATIONS

This is a continuation-in-part of allowed U.S. application Ser. No. 14/081,528 entitled "PORTABLE MAT" filed Nov. 15, 2013, which claims the benefit of priority from U.S. Provisional Application No. 61/728,468, filed Nov. 20, 2012, entitled "PORTABLE MAT USEFUL FOR TEMPORARILY REDUCING APPEARANCE OF CELLULITE AND INCREASING LOCAL CIRCULATION," the contents of each of which are hereby incorporated by reference as if set forth in their entireties.

TECHNICAL FIELD

This disclosure relates, most generally, to portable therapeutic mats. More particularly, the disclosure is directed to portable mats for use in temporarily improving local circulation, reducing the appearance of cellulite, relieving minor aches and pains, and relieving minor muscle spasms. The portable mats change color based on local user body temperature, indicating the degree of therapeutic effect.

BACKGROUND

Studies have shown that a significant percentage of women and some men may have cellulite and that cellulite is genetic and may become more noticeable with age or can be affected by diet, lack of exercise, hormonal changes and/or changes in weight. Cellulite is more commonly seen in the abdomen, buttocks and thighs, but can also be seen in other parts of the body. The cellulite, under the skin, gives the skin a non-uniform appearance sometimes likened to the appearance of cottage cheese. It is a general notion that the dimpled appearance of skin due to the presence of cellulite is unbecoming.

It is understood that the appearance of cellulite can be temporarily reduced or eliminated by mechanical massage which has the effect of stimulating local circulation to the area and promoting lymphatic drainage of excess fluids present in fat cells. Both of these effects of mechanical massage may lead to the temporary appearance of a reduction in the appearance of cellulite.

With this understanding, a number of approaches have been proposed to temporarily reduce the appearance of cellulite. For example, one approach may involve a user using creams such as those containing caffeine or aminophylline to temporarily reduce the appearance of cellulite. However, such creams are messy, with no immediate results (in fact, most see no reduction in the appearance of cellulite for 4 to 6 weeks with daily use), maintenance is difficult to achieve and regular use is hard to maintain, and even when results are good, the recurring costs can be quite expensive. Furthermore, many of the lotions and creams that are applied topically can require multiple applications per week, can require the use of drugs or chemicals, can be irritating to the skin and must be used consistently over time to achieve then maintain desirable results.

As another example, hand-held therapeutic massaging devices designed to temporarily reduce the appearance of cellulite require active use and significant time requirements on the part of the user. Furthermore, undergoing such services/procedures, such as those used in endermologie or cellulaze treatments, requires the user to schedule an appointment to a specialist's office and have no 'at home' utility. Many office procedures may offer similar results in reducing the appearance of cellulite. However, these office procedures require multiple visits to a specialist's office, which are costly and usually more invasive and time consuming, all for a temporary result. In addition, the more invasive the procedure, the more technical skill required by the medical provider and the more dependent the results are on the technician. These more invasive procedures have risks of bruising, bad results and can be painful.

Various mechanical devices that provide massaging or other physical treatment of the skin are also known. Various other chemical treatments and radiation treatments are also known.

U.S. Pat. No. 5,402,545 (Jolley) teaches an orthopedic seat cushion for permitting free circulation and protecting the user's coccyx. A cushion with numerous protrusions is disclosed.

U.S. Pat. No. 5,628,079 (Kizemchuk et al.) is directed to a seat cushion with projections. The seat cushion has a flexible substrate and pads. The pads have a pattern of projections thereon in a spaced, parallel relationship and it is reported that the cushion provides a massage of a person's buttocks or thighs to help alleviate cellulite.

U.S. Pat. No. 5,250,067 (Gelfer et al.) is directed to a body treatment pad having multiple sharpened skin-penetration protuberances. The pad includes a flexible backing sheet having a multiplicity of similarly constructed rigid blocks at spaced points along the sheet surface. Each block has at least one tapered protuberance extending away from the sheet. When the pad is held under pressure against person's body, the sharpened protuberances act as acupuncture elements to stimulate nerve endings under the skin, thereby increasing the blood circulation and relieving pain.

U.S. Pat. No. 5,134,735 (Rose) is directed to a mattress cushion with multiple zones. Each of the cushion's three separate zones has a different compression modulus such that when a person presses down on the zones, support proportional to the body's weight is achieved. U.S. Design Pat. No. 294,212 (Sias et al.) is directed to a design of a seating pad having upwardly extending protuberances. U.S. Pat. No. 4,614,000 (Mayer) is directed to patient undersheet for preventing bed sores that utilizes upwardly extending protuberances. U.S. Pat. No. 4,829,987 (Stewart) is directed a method of treating the human body with a mineral solution and a body wrap to aid in the temporary reduction of cellulite. U.S. Pat. No. 3,744,483 (Picolin) is directed to a walking mat with a base and an upper undulating piece and with upwardly extending protuberances.

As these examples illustrate, prior approaches to temporarily reducing the appearance of cellulite, while potentially effective, create user compliance issues that undermine overall success, including costs, ease of use, portability, allowance for changes in the user's body positioning, size of person, size of chair to accommodate placement of mat, and performance. Consequently, there is ample room for innovations and improvements.

SUMMARY OF THE DISCLOSURE

An object of the present disclosure is to provide a portable mat that can aid in the temporary reduction in the appearance of cellulite, increase of local circulation, temporary relief of minor muscle aches and pains, and relief of muscle spasms without the drawbacks that exist in prior approaches mentioned above, and which exhibits thermographic properties. An increase in skin temperature of the user is indicative of increase in local circulation and an object of the present disclosure is to provide a portable therapeutic mat formed of a thermoplastic elastomer material that includes thermochromic pigments that indicate this change in skin temperature. The thermochromic pigments are chosen as pigments that change temperature in a desired temperature range and work within a certain range of known human body temperatures and which thermographically demonstrate body temperature levels of the user's body.

In some embodiments, multiple thermochromic pigments are used to indicate to temperature changes, i.e. three different temperature regions and two different color transition temperatures. In some embodiments, the multiple thermochromic pigments are homogeneously present throughout the thermoplastic elastomer material of the mat and in other embodiments, different portions of the mat include different thermochromic pigments with associated color changes at associated temperatures.

In some embodiments, a system is provided that includes multiple mats that can have one or more discrete pads. Each pad can be used by itself or with one or more pads. When in use, the portable mat provides a textured surface with protrusions for contacting an area of skin (e.g., the thighs and buttocks of a user in a seated position, the neck and/or back of a user in a resting position, etc.) which accomplishes therapeutic massage of the area with minimal to moderate movement on the part of the user and leaves the user with impressions from the textured surface on their skin which occasions the increase in local circulation to smooth the skin's surface in the post-contact period after use. The increase in local circulation may be noted by the color change due to temperature increase.

In some embodiments, the portable mat includes a base monolithically made of a thermoplastic elastomer material having a thickness, and at least a first surface on a plane. In some embodiments, a plurality of protrusions arranged in close proximity or adjacent to each other extend from the first surface, forming a textured surface for the portable mat. The plurality of protrusions may have the same or similar geometric configuration, with each protrusion having a tip which may be a blunt tip. In some embodiments, each protrusion may have a height between approximately 0.10 inches and 0.50 inches but other heights may be used in other embodiments. In some embodiments, the plurality of protrusions may have a hardness or resilience between 10-150 Shore A on the Durometer scale but other hardness values may be used. The plurality of protrusions thus configured can cause non-transdermal temporary indentation when the portable mat is in use. In various embodiments, either or both of the base and the plurality of protrusions may be formed of a thermoplastic elastomer material and the thermoplastic elastomer material may have a thermal conductivity between 0.04-0.52 W*m.sup.-1*K.sup.-1. In various embodiments, either or both of the base and the plurality of protrusions are formed of the thermoplastic elastomer material having the thermochromic pigments, the thermochromic pigments useful for thermographically demonstrating body temperature.

The base may be solid and/or have one or more openings. In some embodiments, the base may have two halves, and each half of the base may be substantially a mirror image or complementary of the other half of the base. In some embodiments, the base can have a thickness between approximately 0.5 inches and approximately 0.625 inches. In some embodiments, the base may have a first thickness of approximately 0.5 inches near an edge and a second thickness of approximately 0.625 inches near the center of the base.

Specifically, when a user uses an embodiment of a portable therapeutic mat disclosed herein by sitting or resting on it, the application of the user's body weight against the portable mat's textured surface produces an effective therapeutic massage, leaving the user with an 'imprint' on the surface of their skin mirroring the textured surface of the portable therapeutic mat, thus alternatively referred to as a "massage mat". After a short period of time (e.g., within 15 minutes) of use, the user may feel a slight sensation of warmth. This increase in the user's skin temperature is verifiable and corresponds to an increase in local blood circulation caused by the user's body reacting to the portable mat's imprinting effect and is verified by a color change in the mat as indicated thermographically due to the thermochromic pigments. After removal of the mat, the increased local blood circulation acts to smooth out the 'imprinted' skin surface. The user may use the mat for various periods of time, for example one half hour, and the color change in the mat may be used to indicate that the user has sat or rested upon the mat for a sufficient time to achieve a therapeutic effect. Within a short period of time after removal, e.g., within an hour, the user may benefit from a temporary reduction in the appearance of cellulite in the 'massaged' area, temporary relief of minor muscle aches and pains, and/or relief of muscle spasms (e.g., after one half hour of use).

In some embodiments, the portable mat is part of a kit that includes, for instance, a case for storing and transporting the portable mat. Numerous other embodiments are also possible.

Embodiments disclosed herein provide many advantages over the prior approaches mentioned above. For example, the portable mat can be used anywhere and the cost can be a fraction of that of the office procedures or the recurring cost of maintenance of other products or services. Furthermore, the effects produced by the use of a portable mat disclosed herein do not require drugs or chemicals, do not involve office visits and/or expensive device/equipment/creams/locations, and have been shown to occur immediately within one hour of use. Embodiments can be used as frequently (or infrequently) as desired. Usage can be tied to one's daily routine such as sitting for thirty minutes. The change in color of the mat is indicative of an increased body temperature and may indicate a successful therapeutic session.

These, and other aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWING

The drawings accompanying and forming part of this specification are included to depict certain aspects of the disclosure. A clearer impression of the disclosure will become more readily apparent by referring to the exemplary, and therefore non-limiting, embodiments illustrated in the drawings. Wherever possible, the same reference numbers will be used throughout the drawings to refer to the same or like features (elements). The drawings are not necessarily drawn to scale.

FIG. 4 depicts another side view of an embodiment of a portable mat;

FIGS. 5 and 6 depict side views of embodiments of a portable mat;

DETAILED DESCRIPTION

Figure 1A:
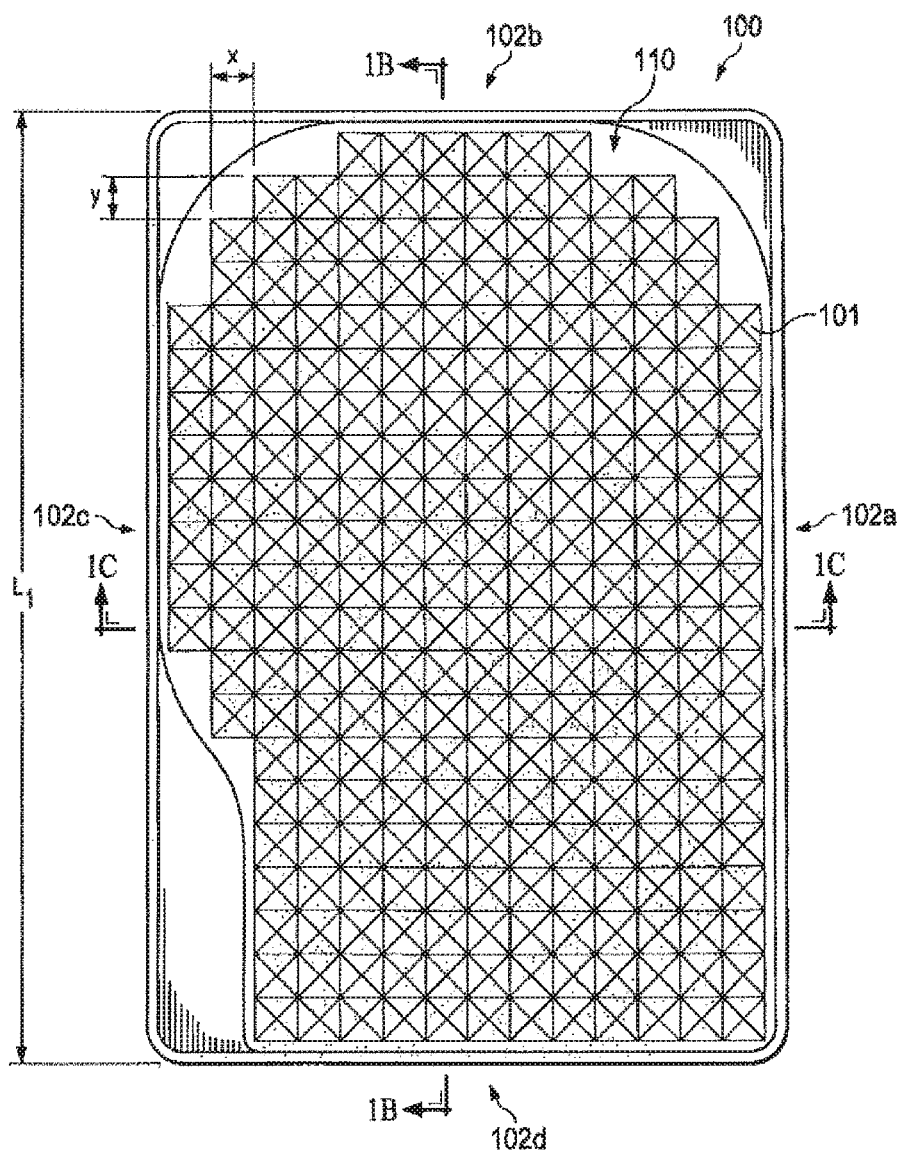
FIGS. 1A-1D depict top, cross-sectional, and close-up views of one embodiment of a portable mat.
Figure 1B:
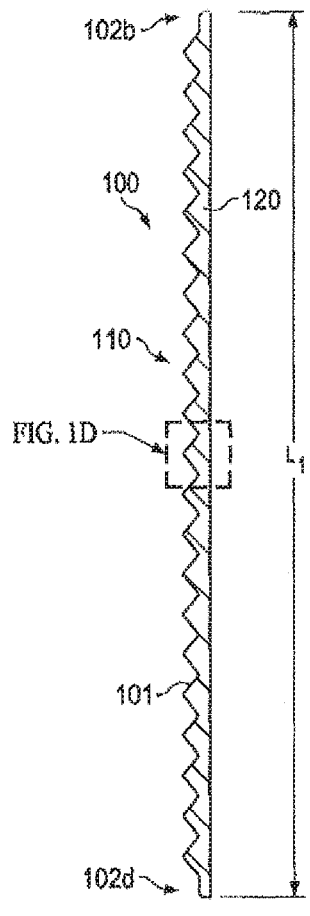

Embodiments disclosed herein provide a portable mat, system, and kit that may be useful for temporarily reducing the appearance of cellulite, temporarily increasing local circulation, temporarily relieving minor muscle aches and pains, and temporarily relieving muscle spasms. Other benefits may also be achieved, such as relief of minor back aches or muscle spasms to the upper and lower spinal areas.

In some embodiments, the portable mat can be made of a flexible material such as thermoplastic elastomer. Other materials may also be used. For example, the portable mat can be made of rubber, plastic, glass, fiberglass, metal, bamboo, wood, hard plastic, or a composite material. As a non-limiting example, the portable mat may be made of a material having a sufficiently high durometer (e.g., 10-150 Shore A) so that the protrusions are not substantially compressed by the user's weight and can leave a visible pattern or 'imprint' on the skin after use, ensuring that the indentations they create are the intended shape and size. The portable mat has a form factor that allows it to be used in various positions such as sitting or when the user is lying on the side, on the back, or face down.

In some embodiments, a portable massage mat disclosed herein can be made monolithically out of a single piece of material. In some embodiments, a portable mat disclosed herein can be made using an injection molding process.

In some embodiments, the portable mat exhibits thermographic properties and can be made of a flexible thermoplastic elastomer that includes one or more thermochromic pigments. In other embodiments, other materials may be used and include the thermochromic pigment. A thermochrome is a substance that can change color due to a change in temperature. Thermochromism is the property of substances changing color due to a change in temperature. This is achieved in manufacturing by adding thermographic or thermochromic pigments to the thermoplastic elastomer or to the other materials used to manufacture the therapeutic massage mat. Thermochromic pigments, can also be referred to as thermochromic dyes (but will be referred to as thermochromic pigments herein to avoid confusion with other dyes) and are used in conjunction with more conventional dyes or other suitable coloring agents used to color the thermoplastic elastomer material.

Adding thermochromic pigments to the material used for the mats, allows for a distinct color change to the massage mats consistent with a corresponding increase in skin temperature with use. In advantageous embodiments, the thermochromic pigment is added to a thermoplastic elastomer. The addition of the thermochromic pigment provides the advantage of visually demonstrating an increase in temperature of the skin, which is indicative of increased local circulation which confers the benefits described above. The range of thermographically indicated color change can be determined by the particular thermochromic pigments used. Skin temperature generally ranges from about 83 degrees (pre-use) to about 96 degrees F. (post-use) but different temperature ranges are achieved for various other users. As such, thermochromic pigments that change color in the range of 83-96° F. may be advantageously used. In such embodiments, only the original base color of the colored thermoplastic elastomer would typically be seen prior to use as conventional normal room temperature is generally lower than 83 degrees. The temperature range of the selected thermochromic pigment will generally be just below normal skin temperature before use, or below 84° F., up to the expected post-use elevation in skin temperature, approximately 96° F. with the transition temperature at which the pigment changes color, lying in that range.

The thermochromic pigment can be microencapsulated in a polymer such as used in the thermoplastic elastomer, but other techniques and materials may be used in other embodiments. The thermochromic pigment may be infused into or added to the base material using various suitable known means. The base material may be a thermoplastic elastomer of a particular color, such as may be achieved using conventional dyes or other suitable coloring agents. Thermochromic materials used as the thermochromic pigment include liquid crystals and Leuco dyes. Liquid crystals, such as used in "mood rings," can be used. Thermochromatic liquid crystals display different colors at different temperatures due to selective reflection of certain wavelengths by the crystallic structure of the material that changes between the low-temperature crystalline phase and the high-temperature isotropic liquid phase. A Leuco dye is a dye which can switch between two chemical forms, one of which is colorless. Reversible color transformations can be caused by heat. Some commonly used Leuco dyes are spirolactones, fluorans, spiropyrans and fulgides. The Leuco dye may be mixed with other chemicals such as acids and salts to produce different color variations. When the Leuco dye is mixed with other chemicals, it will then be able to switch between two chemical forms including a darker color and a lighter color.

At room temperature, or at temperatures below the color transition temperature of the chosen thermochromic pigment, the color of the mat material will generally be the combination of the color of the thermoplastic elastomer due to conventional dyes or coloring agents used to color the thermoplastic elastomer, and the colored version of the Leuco dye, or the color of the mat material below the color transition temperature will be the color of the thermoplastic elastomer in combination with the darker colored form of the Leuco dye. The material used to form the mat can be colored using various base dyes or other coloring agents. The thermochromic pigment is added to the colored mat material. When the temperature is increased past the color transition temperature of the thermochromic pigment, the Leuco dye switches from its darker color to its lighter color or, from its colored form to its colorless form.

In some embodiments, the thermochromic pigment is distributed homogeneously throughout the thermoplastic elastomer. In some embodiments, both the base and the protrusions are formed of the thermoplastic elastomer with the thermochromic pigment. In some embodiments, only the base or only the protrusions are formed of the thermoplastic elastomer with the thermochromic pigment. In some embodiments, the thermochromic pigment is used throughout the mat and in other embodiments, the thermochromic pigment is only used in specified regions of the mat. For example, some regions of the protrusions may include the thermochromic pigments while other regions do not. Each thermochromic pigment provides a color change at an associated temperature.

In some embodiments, more than one thermochromic pigment is used. Each thermochromic pigment provides a color change at an associated, predetermined temperature and, when multiple thermochromic pigments are used, two distinct temperature changes may be thermographically exhibited at a single location. According to this embodiment, three distinct levels of temperature can be noted. In some embodiments, the two thermochromic pigments are homogeneously present throughout the thermoplastic elastomer or other material that forms the mat. In various embodiments, the thermoplastic elastomer with multiple thermochromic pigments may be used to form both the base and the protrusions, only the base, or only the protrusions.

In other embodiments when more than one thermochromic pigment is used, the various thermochromic pigments may be disposed in different regions of the mat. For example, the protrusions may include different thermochromic pigments in different regions and in some embodiments, one region may include a single thermochromic pigment and another region includes more than one thermochromic pigment, or no thermochromic pigment, in the material.

Color change indicates skin temperature change, and skin temperature change is indicative of increased local circulation to the skin and area. The color change is related to the length of time the user sits on the mat. Generally after about a half hour to an hour, the color change should max out demonstrating increased temperature and circulation. Sitting or lying on the mat, for extended periods of time is not recommended. The addition of the thermochromic pigments demonstrate to the user that they've achieved an increase in circulation, i.e. a therapeutic effect, simply by sitting on this therapeutic massage mat.

Various thermochromic pigments are available and may be used by addition to the colored thermoplastic elastomer or other suitable material. The thermochromes for the thermochromic pigments are indicated above and generally change from colored form to an uncolored form or from a darker color to a lighter color due to an increase in temperature. The change in color is reversible.

In some embodiments, the portable therapeutic massage mat is nonporous and has no seams or holes. These features protect the portable mat from being penetrated by bodily fluids, dirt, chemicals, and/or high-pressure water. Hence, it is easy to clean in a dishwasher.

In some embodiments, the portable therapeutic massage mat includes one or more pads, each with a pattern of protrusions positioned thereon. In some embodiments, each of the protrusions (also referred to as protuberances) can be a three dimensional (3D) shape. As a non-limiting example, the 3D shape can be a tetrahedron or a pyramid. Other geometric 3D shapes are also possible, so long as each protrusion has a tip configured to create a desired impression in the skin and contact, but not penetrate, the skin when a person sits or lies on the mat, e.g. they should have a blunt tip. These protrusions can be identical or substantially identical across the mat. Further, in some embodiments, the protrusions can be equally spaced from one another. In some embodiments, the protrusions can have the same height or they may have varying heights. The number of protrusions per pad may vary from implementation to implementation, depending upon the size and/or shape of the underlying pad, as well as the size and/or shape of the individual protrusions.

A measurement of protrusions per unit area of the portable massage mat may be referred to as the protrusion density for the mat. Protrusion density may be selected such that a distance between two adjacent protrusions (e.g., as measured between their tips, edges, and/or bases) does not exceed a maximum threshold. This maximum threshold may vary depending upon individual users (e.g., age, gender, skin thickness, skin sensitivity, etc.) such that the protrusions of a portable mat can support a user's weight and such that contact between the user's skin and such that any one protrusion does not cause damage or excessive pain to the user by that protrusion.

The protrusion density for the portable massage mat may also vary depending upon the hardness of each protrusion, the shape of each protrusion, the shape of the tip of each protrusion, and/or some other characteristic. In various embodiments, the protrusion density for a mat having pyramidal or frustro-pyramidal protrusions with a hardness of approximately 80 Shore A is between approximately 2-3 protrusions per square inch (which is an example of a unit area). However, more or fewer protrusions per square inch may be used, depending on how much spacing is present between adjacent protrusions, the size and/or shape of the base for each protrusion, the height of each protrusion, etc. For example, a mat having rounded protrusions may have a lower protrusion density than a mat having angled protrusions, a mat with protrusions having hardness of 100 Shore A may have a higher protrusion density than a mat with protrusions having a hardness of 50 Shore A, a mat having protrusions that extend 0.5 inches may have a lower density than a mat with protrusions that extend only 0.25 inches, etc.

In some embodiments, the portable mat disclosed herein can have two or more discrete pads, each having a pattern of protrusions positioned thereon. These pads may have the same or different patterns of protrusions and may be made of the same or different materials. These pads may have the same or different shapes. In one embodiment, a portable mat can be made of two symmetrically shaped pads. In one embodiment, the pads are rectangular. Other shapes are also possible and anticipated. For example, the pads can have oval, irregular, square, circular, octagonal shapes or the like. The pads can be used separately or together at the same time. The mat size can be extended to include sufficient skin contact to effectuate a full body mat surface contact area.

The pads of a portable mat disclosed herein can be permanently or temporarily attached to each other using a variety of attachment mechanisms. For example, in one embodiment, two or more pads may be removably attached to each other via a hook and loop arrangement. As another example, in some embodiments, one or more flexible cables or cords of same or different lengths may be used to join two or more pads to form a portable mat. Other suitable attachment mechanisms may also be used.

The ability to separate and attach multiple pads as desired allows a user to position and/or align the pads with the contour of their individual body. For example, a user may position two pads, each under a thigh and joining at a corresponding corner to form a "V" pattern when the user sits on the mat placed on an office chair. The same user may arrange the same pads in parallel to form a "parallel" pattern when the user sits on the portable mat placed on a seat in an airplane. In this example, the airplane seat is a lot smaller and hence more restrictive than the user's office chair. However, the user can still adjust the orientation of the pads to fit the seat and the position at which it is used. The portable mat disclosed herein can therefore accommodate differences in user size, use position, seat restrictions, etc.

In some embodiments, the protrusions on a pad can taper down toward one or more sides of the pad. For example, the height of the protrusions on a pad can taper down toward a side of the pad that is designed to be positioned under the thigh just above the knee (popliteal fossa). In other words, the height of the protrusions near the edge or side of the pad is less than the height of the protrusions near the center of the pad. The reduced height of the protrusions in this area can minimize pressure to the knee pit, allowing better blood circulation and lymphatic drainage and alleviating the possibility of limiting blood flow. Another example can be that the height of the protrusions on a pad can taper to the anatomical structure of the pelvis and allow for more comfort in the area of contact between the pads and the ischial spines. In another embodiment, the pad itself is constructed to be ergonomic forcing the user to tend to lean/sit in a more forward position when using the pad.

These protrusions are configured to enable a reduction in the appearance of cellulite when the skin is placed in contact with a surface of the mat patterned or otherwise textured with the protrusions for a period of time, for instance, in the range of an hour, more or less. The patterned surface promotes keeping the skin in contact with the surface relatively fixed against the surface of the mat such that fat tissue is also thus fixed relative to the textured surface. The mat can leverage a user's body weight against the textured surface as well as when there is slight movement of the body, such as shifts in the body's positioning with normal desk-type activity.

More specifically, the pattern of protrusions can be configured or otherwise arranged such that when the mat is placed under the buttocks and thighs of a user, the protrusions can impress upon the user's skin. When the mat is sat upon by the user, the user's own body weight and natural motion (passive massage) can drive the protrusions into, but not breaking, the skin, pushing the fluids out from where the skin is impressed with the indentations and creating a mechanical massage. The pressure from the protrusions can also cause impressions to occur in the skin and the user's body naturally reacts by increasing blood flow to the area (erythema) to counter the indentations caused by the protrusions. The non-porous material used also enhances a warming effect and the skin temperature of the user increases during the use period. After sitting on the mat for a period of time, for instance, about half an hour, once or twice per day, the mat is separated from the user (e.g., the user stands up from sitting or lying on the mat). The indentations gradually disappear from the skin and the blood circulation to the local area begins to subside, both effects leaving an effect of temporary reduction in the appearance of cellulite.

Embodiments of a portable mat disclosed herein can have a form factor and weight comparable to a tablet computer, making them easy to carry, transport, and store. As a non-limiting example, a mat encompassing a set of two discrete pads can weigh about two pounds or less and easily accommodate carrying pads for use in a car seat, office chair, or typical sitting situations at home or at a restaurant.

Embodiments of a portable mat disclosed herein can incorporate design elements such that their actual function is not readily apparent, making it possible for users who may have concerns about revealing their purpose can carry them around without the concern that others will notice. For example, in various embodiments, the materials can be colored using impregnating dye(s) and/or surface paint(s). Embodiments of a portable mat disclosed herein can conform to most seating surfaces without being damaged and/or without damaging the seating surfaces.

The disclosed portable mat is easy to clean. For example, the portable mat may be cleaned in a common household dishwasher or washed by hand. The heat of the dishwasher will not damage the integrity of the mat for repeated uses and the mat can tolerate extremes of heat, such as leaving it in the car in hot temperatures.

Embodiments of a portable mat disclosed herein can provide a low risk solution to temporarily reduce the appearance of cellulite, temporarily increase local blood circulation, temporarily relieve minor muscle aches and pains, and/or relax muscles locally. The invention and the various features and advantageous details thereof are explained more fully with reference to the non-limiting embodiments that are illustrated in the accompanying drawings and detailed in the following description. Descriptions of well-known manufacturing techniques, components and equipment are omitted so as not to unnecessarily obscure the invention in detail. It should be understood, however, that the detailed description and the specific examples, while indicating embodiments of the invention, are given by way of illustration only and not by way of limitation. Various substitutions, modifications, additions and/or rearrangements within the spirit and/or scope of the underlying inventive concept will become apparent to those skilled in the art from this disclosure.

FIGS. 1A-1D depict top, cross-sectional, and close-up views of one embodiment of a portable mat (device 100) alternatively referred to as a massage mat or therapeutic massage mat. As depicted in one or more of FIGS. 1A-1D, device 100 may be formed with base 120 having edges with lengths L1 and L2. Base 120 may have a single thickness (e.g., T1) or base may vary in thickness and have two or more thicknesses (e.g., T2 and T3). Device 100 may be formed as a single piece, or portions of device 100 may be formed and then mechanically, chemically or thermally bonded or joined to form device 100. In one embodiment, T1 may be 0.125 inches. In one embodiment, T1 may be 0.165 inches. In various embodiments, T2 is greater than T3. In one embodiment, T2 may be 0.125 inches and T3 may be 0.165 inches. Various other values for T1, T2, and T3 may be used in other embodiments.

Base 120 may be formed of a material selected for desired characteristics relating to use, transport, storage, or cleaning. For example, device 100 may be formed with base 120 being solid or having one or more openings (not shown) for ease of handling during use and/or transport. Device 100 may also be formed with a material having one or more characteristics including, but not limited to, anti-microbial surfaces, low thermal conductivity, flexibility, light weight, latex free, odorless, non-toxicity, color, texture, and hardness/resilience (e.g., as measured on a durometer scale).

Base 120 may be formed of flexible material based on use, transport or storage. In some embodiments, base 120 may be formed with a flexibility to conform to the user's body to ensure a maximum number of protrusions contact the user's skin, or to avoid contact with an area. For example, a user might want the maximum number of protrusions contacting the gluteus area and roll device 100 inward (i.e., may wrap device 100) around that area, or the user might want to avoid the back of the knee and may roll device 100 outward (i.e., turn out device 100) to ensure no contact with that area. In some embodiments, base 120 may be formed with a flexibility to conform to most seating surfaces without being damaged by the seating surface and without damaging the seating surface. In some embodiments, base 120 may be formed with a flexibility to enable a user to position device 100 in a desired configuration, such as for use in an airline seat, a bus seat, or the like. In some embodiments, base 120 is formed to have a flexibility that allows a user to roll device 100 for easier transport or more compact storage.

In some embodiments, the massage mat, device 10 may be formed of a material with a low thermal conductivity. When the massage mat, device 10 is in contact with human skin, low thermal conductivity may help retain heat near the skin. Retaining heat near the skin advantageously causes local body temperatures to increase. In some embodiments, local body temperatures may increase by one degree (Fahrenheit), or local body temperatures may increase between 3-5° F. or more. Increasing local body temperatures may cause blood circulation to increase in those areas. The massage mat, device 10 functions by making impressions upon the user's skin which causes local blood circulation to increase which, in turn, causes local body temperature to rise as indicated by the thermographic nature of the massage mat to the inclusion of the thermochromic pigments.

In some embodiments, device 100 is formed of a thermoplastic elastomer. Device 100 generally includes the thermoplastic elastomer having a base color as a result of a conventional dye or other coloring agent which will be uniformly distributed throughout the device 100. In various embodiments, the thermoplastic elastomer includes one or more thermochromic pigments, as described above. According to these embodiments, the increase in the local body temperature is indicated by the change of color of device 100, do to the thermochromic pigments that may be distributed homogeneously throughout device 100 or only in certain regions. In some embodiments, more than one thermochromic pigment is used either throughout device 100 or in different regions and device 100 and according to this embodiment, multiple color changes may more particularly point out the change in local body temperature as a result of the use of the device 100. For example, one thermochromic pigment may change color at X° and the other thermochromic pigment may change color at X+y°. According to this embodiment, three different colors may be noted: one color at temperatures less than X degrees, a second color within the temperature range of X–X+y° and a third color at temperatures greater than X+y°.

In some embodiments, base 120 may be formed from a material that is anti-bacterial, bacteria-resistant or that otherwise inhibits or decreases the likelihood of transmitting germs. In some embodiments, base 120 may be dishwasher safe to allow a user to easily clean device 100 between uses.

In some embodiments, device 100 may be formed from a polyurethane elastomer product such as PMC 780 Dry and Wet available from Smooth-On, Inc. of PA. The composition provides a nearly impervious surface, is easy to clean by hand or in a dishwasher, has a low thermal conductivity, can be formed to have a desired flexibility and hardness, does not stain, and can be formed in a variety of colors. Other materials and compositions may be possible.

Device 100 may have edges 102a, 102b, 102c and 102d, with lengths L1 and L2. In one embodiment, L1 may be 13.4 inches. In one embodiment, L1 may be 13.665 inches. In one embodiment, L2 may be 8.875 inches. In one embodiment, L2 may be 9.29 inches. In some embodiments, at least one edge has a length L1 or L2 between 10-24 inches. These values are provided by way of example only and various other values for L1 and L2 are used in other embodiments.

Edges of device 100 may be straight or curved. At least one edge may have length L1 or L2 to allow a person to sit on device 100 and have substantially all of the person's buttocks or thighs supported by device 100.

Figure 1D:
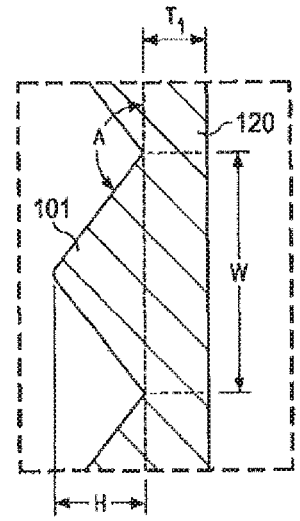
Figure 1C:
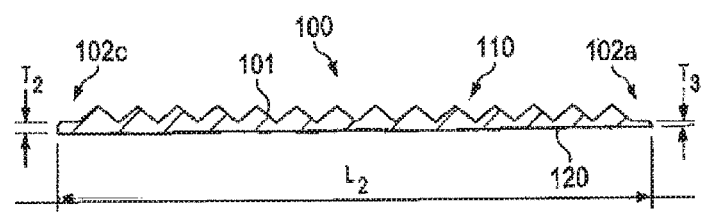

Device 100 may be formed with base 120 having array 110 of protrusions 101 protruding from a top or first surface lying on a plane of base 120. Each protrusion 101 may have a geometric configuration with an angular surface, such as a pyramid, or may have a curved surface, such as a cone. Protrusions 101 may be formed having surfaces with varying slopes. In some embodiments, each protrusion 101 may be formed with a blunt (not sharp) tip or point. A blunt tip may be formed with a first slope near the base and a second slope that is less steep than the first slope near the tip. For example, a first slope may equate to a 45 degree angle, and a second slope may equate to a 30 degree angle. A pyramidal frustum and a conical frustum are examples in which the second slope may be substantially zero. As illustrated in FIG. 1D, each protrusion 101 may be defined by a width W, a height H, and an angle A relative to the top side of base 120. In some embodiments, H may be between 0.265 and 0.259 inches but other heights are used in other embodiments. In some embodiments, W may be between 0.5 and 0.75 inches, but in each case, other values are used in other embodiments. In some embodiments, A may be between 120-150 degrees. In some embodiments, width W may correspond to width X or width Y such that protrusions 101 contact other protrusions.

Protrusions 101 may be formed with a particular hardness that can be measured using a durometer. A durometer measures the hardness of a material. In this case, hardness may be defined as a material's resistance to permanent indentation. The durometer scale is typically used as a measure of hardness in polymers, elastomers, and rubbers. One or more of the height H, width W, angle A or hardness may be selected such that, in use, the tip of any protrusion 101 may leave an indentation or impression in a user's skin but protrusions 101 do not pierce, penetrate or otherwise cause permanent damage to the skin. In some embodiments, protrusions 101 may have between 10-150 Shore A hardness on the durometer scale but other hardnesses may be used in other embodiments.

Protrusions 101 may be formed as part of array 110. In some embodiments, array 110 may be formed having columns and rows. The number of protrusions 101 in any row or column may vary. For example, as depicted in FIG. 1A, array 110 may be shaped to have a desired appearance, and protrusions 101 may be positioned and spaced accordingly. In FIG. 1A, array 110 has rows and columns that are parallel to an orthogonal to the strait right-hand side of device 100 but in other embodiments, the rows and columns may extend diagonally or in other orientations. In some embodiments, the array includes a concentric set of rings. The number of protrusions 101 in array 110 may vary based on the size, spacing and shape of protrusions 101. Array 110 may be formed with protrusions 101 proximate other protrusions 101. In some embodiments, protrusions 101 may contact other protrusions 101.

Figure 2:
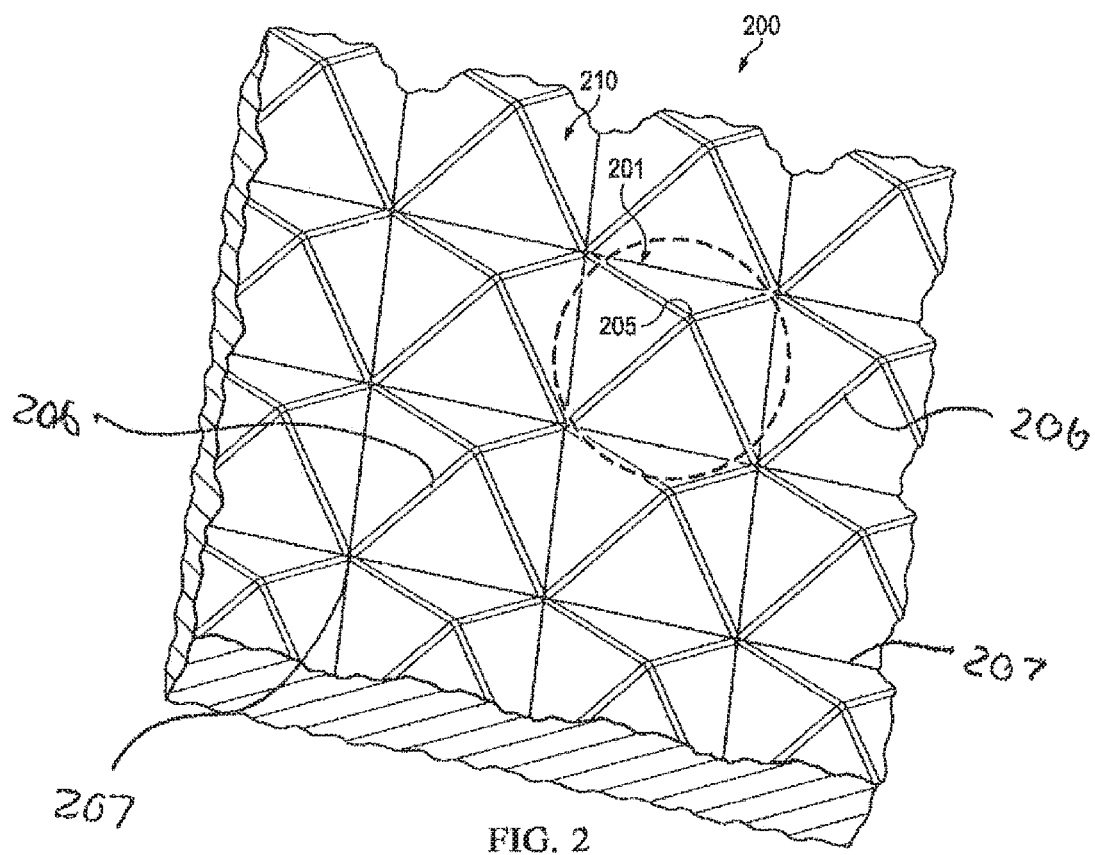
FIG. 2 depicts a close-up perspective view of a portion of an embodiment of a portable mat.

FIG. 2 depicts a close-up perspective view of a portion of one embodiment of a portable mat (device 200). Device 200 may have array 210 of protrusions 201. Array 210 of protrusions 201 may be an embodiment of array 110 of protrusions 101 described above. Protrusions 201 may be shaped, sized, and spaced to meet desirable anatomical or physiological differences in soft tissues. These differences may allow protrusions 201 to force or otherwise cause fluid to go out of soft tissues, increase blood circulation in the area, cause irritation to inhibit or discourage fluid from building up in soft tissues, or provide some other physiological difference resulting in a decreased appearance of cellulite in the area.

Array 210 may comprise columns and rows of protrusions 201 as illustrated, but other configurations of array 210 are used in other embodiments. Still referring to FIG. 2, each protrusion 201 may be close to other protrusions 201 in array 210 or the protrusions 201 may contact other protrusions 201 in array 210. Each protrusion 201 may have blunt tip or point 205 shaped and sized to prevent damage to skin. As used herein, the term "tip" may refer to the apex, a portion of protrusions 201 configured for non-transdermal, non-penetration contact with skin. Tips 205 of protrusions 201 may be sized and shaped to cause indentations in skin after contact with the skin, but do not damage nerves, blood vessels, lymph nodes, bones, or other tissues. Embodiments may prevent or avoid damage to the skin such as nerve damage, a buildup of scar tissue, and the like. For example, tips 205 or protrusions 201 may be shaped, spaced and sized such that a user may sit on or otherwise contact skin with device 200 for a period of time (e.g., 5 minutes, 10 minutes, 30 minutes, etc.) and the pressure will cause protrusions 201 to leave indentations in the skin, but the indentations smooth out and disappear within a short time period (e.g., 5-45 minutes) after device 200 is disengaged from contacting the skin. FIG. 2 shows that edges 206 between the triangular side faces of the square pyramid shaped protrusions 201 are beveled. In some embodiments, edges 206 are beveled uniformly from the base of the pyramid, i.e. base surface 207, to tip 205. Those skilled in the art will appreciate that the size, shape and spacing of indentations will be affected by other factors which may include, but are not limited to, the person's weight, gender, body type, absence or degree of appreciable cellulite and age.

Figure 3:
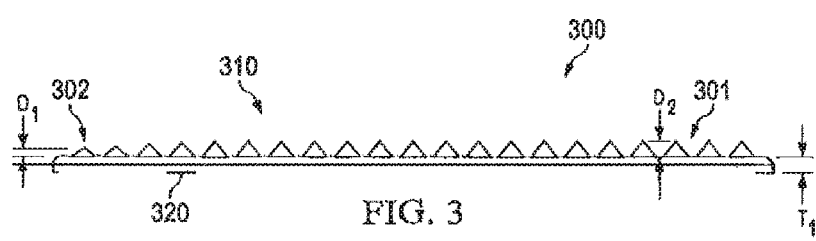
FIG. 3 depicts a side view of an embodiment of a portable mat.

FIG. 3 depicts a side view of one embodiment of a portable mat (device 300), illustrating different configurations of protrusions on a base. Device 300 may be an embodiment of device 100 described above. In this example, base 320 may have a thickness that remains substantially constant across base 320, but profiles of protrusions on base 320 may vary across base 320. As depicted in FIG. 3, base 320 may have a first thickness T1, and protrusions 301, 302 may vary in size (e.g., height) from a first edge to a second edge opposite the first edge, from a first edge to an area near the middle, or some combination. For example, in one embodiment, the height of array 310 of protrusions 301, 302 on device 300 can taper down toward a first edge such that D1 for protrusion 302 is less than D2 for protrusion 301. Advantageously, this taper or reduction in height may allow device 300 to be used under the thigh with the tapered portion proximal to the knee. The reduced height of protrusions 301 in this area can minimize pressure to tissues in the knee pit, allowing better blood circulation and lymphatic drainage and alleviating the possibility of limiting blood flow.

FIG. 4 depicts another side view of one embodiment of a portable mat (device 400). Device 400 may be an embodiment of device 300 depicted in FIG. 3, rotated 90 degrees. As illustrated in FIG. 4, array 410 of protrusions may span from a first edge to a second edge opposite the first edge. The protrusions may vary in height between two edges, as exemplified by D3 and D4, indicative of the height of the protrusions, D3 being less than D4. Combined with the example shown in FIG. 3 in which the protrusions may also vary in height (D1 and D2) between two edges, FIG. 4 shows an example embodiment in which array 410 of protrusions may vary in height toward the edges, as illustrated by protrusions 401, 402, 403, and 404. Those skilled in the art will appreciate that D1, D2, D3 and D4 may differ from implementation to implementation as needed and/or desired.

FIGS. 5 and 6 depict side views of embodiments of a portable mat. As depicted in FIG. 5, device 500 may include base 520 having array 510 of protrusions 501 protruding from a first side of base 520 and array 515 of protrusions 501 protruding from a second side of base 520. As depicted in FIG. 6, device 600 may include base 620 having array 610 of protrusions 601 protruding from a first side of base 620 and array 615 of protrusions 616 protruding from a second side of base 620.

As exemplified in FIG. 6, protrusions 601 may be angular, such as pyramidal, and protrusions 616 may be curved, such as semi-spherical, or otherwise have a shape that is different than protrusions 601. Advantageously, having two sides with each side having protrusions with different shapes, hardness, sizes, etc., may allow a user to control and/or choose effects of device 600. For example, a user may tolerate sitting on a first side for a longer amount of time, a user may like the results associated with one side rather than the other side, or some other reason. In various other embodiments in which the mat includes protrusions on each of opposed sides, the respective protrusions may have various shapes and be arranged in various arrays and configurations.

Figure 7:
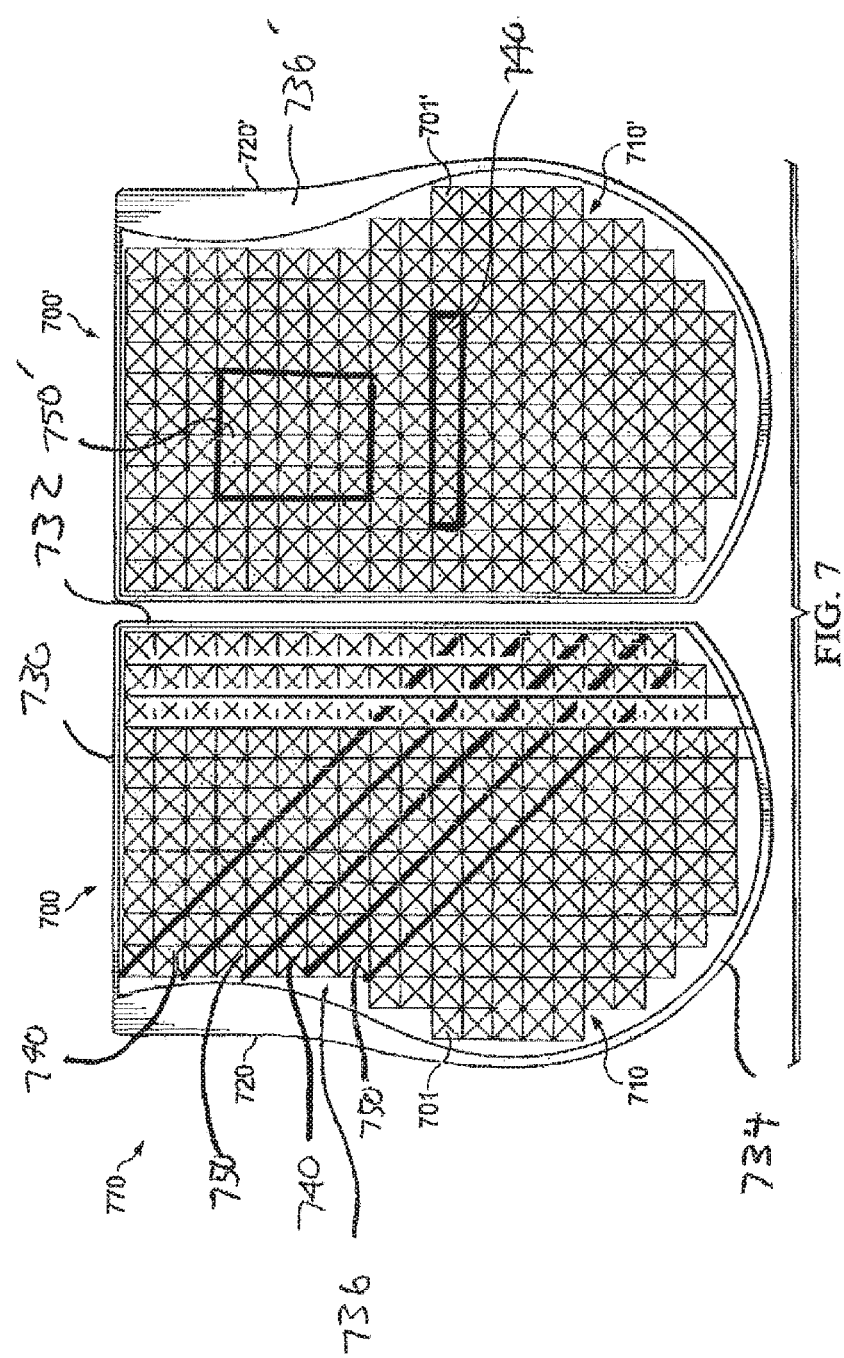
FIG. 7 depicts a top view of embodiments of a portable mat system with distinct thermochromic pigment regions identified.
Figure 8:
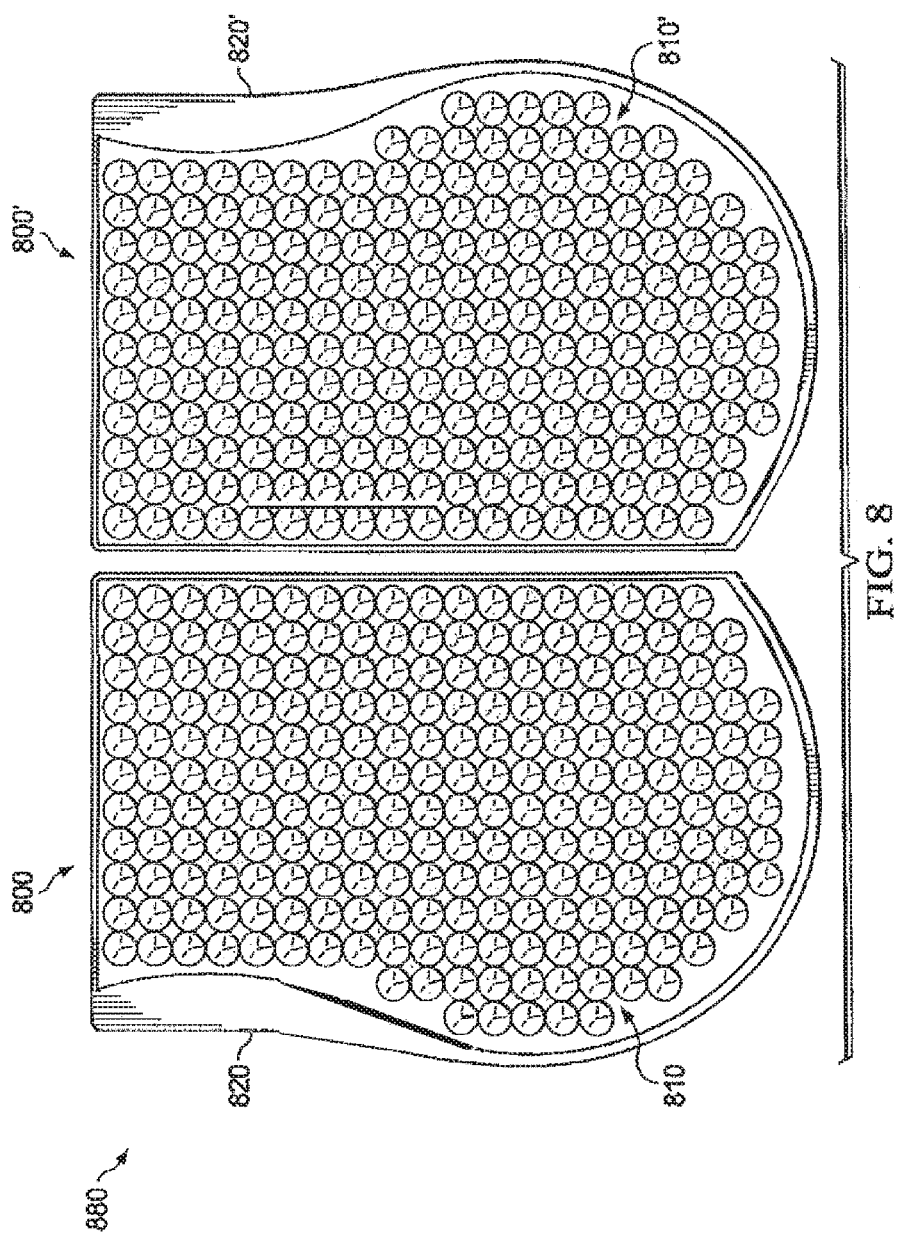
FIGS. 8-9 depict top views of various embodiments of the portable mat system according to the disclosure.
Figure 9:
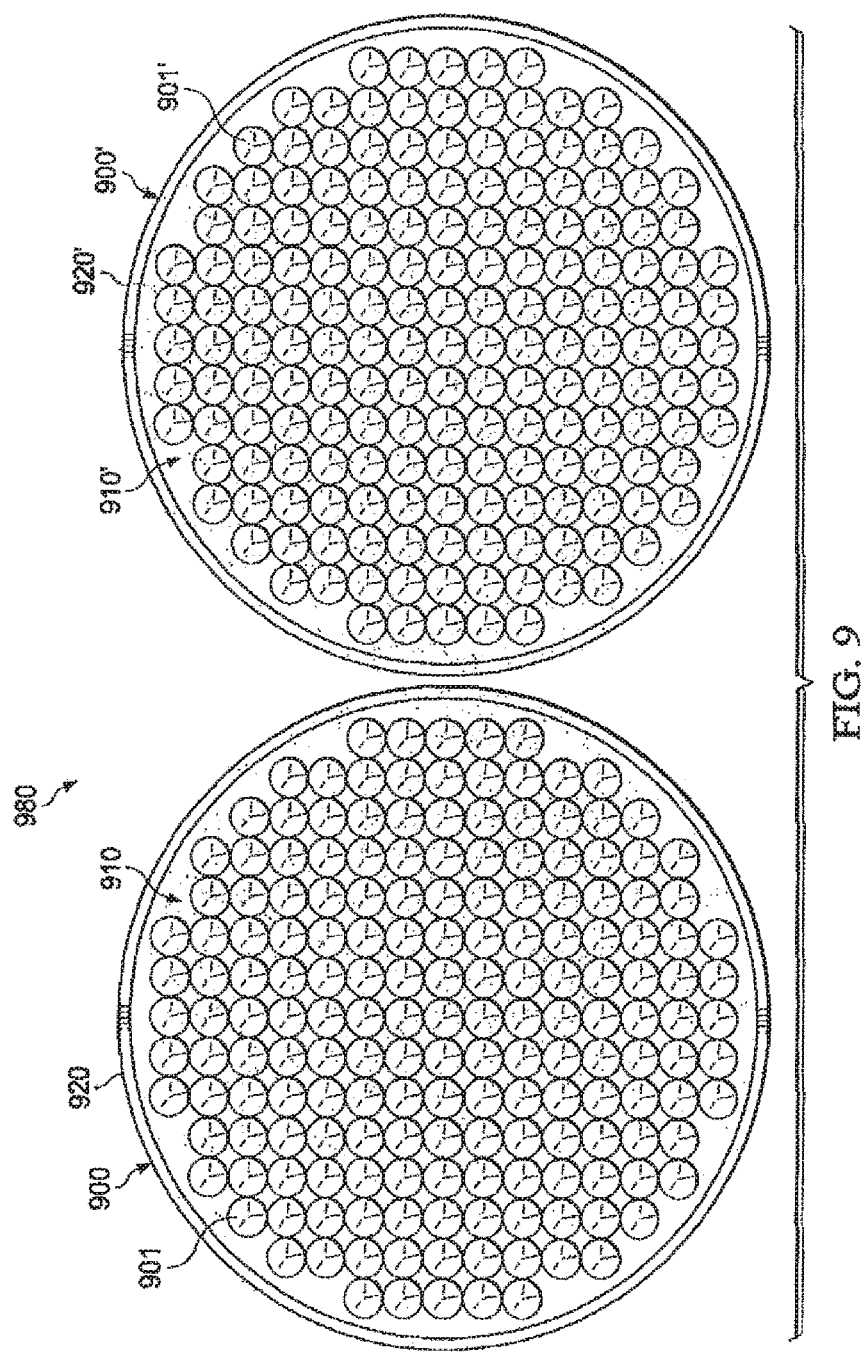

FIGS. 7-9 depict top views of various embodiments of a portable mat system.

FIG. 7 shows mat system 770 including two halves 700, 700' also referred to as mats 700, 700'. Each mat 700, 700' has an array 710, 710' of pointed protrusions 701, 701'. As depicted in FIG. 7, halves 700, 700' may be symmetric. In some embodiments, halves 700, 700' may be complementary, identical, asymmetric, or mirrored, but they also may be different. Mats 700, 700' may be shaped to maximize the number of protrusions 701, 701' in contact with the thighs or buttocks of a seated user. As depicted in FIG. 7, mats 700, 700' may have a first edge that is substantially straight and a second edge that has a curvature based on a profile of a user's buttocks and thighs. In particular, mat 700 is bounded by two straight edges 730 and 732 and these two straight edges intersect orthogonally and are joined by a curvilinear edge 734. Having an edge that is substantially straight allows a user to position mats 700, 700' in a "V" or "parallel" configuration in which both halves 700, 700' are positioned relative to a single limb of a user to treat a greater surface area of the limb, or in which both halves 700, 700' are positioned on the outside of each thigh or buttock. Having an edge that is curved may allow a user to conform each half 700, 700' to optimize contact with protrusions 701, 701' or to avoid contact with protrusions 701, 701'. System 770 may form part of a kit (not shown), which may also include a carrying case, cleaning materials, belts or straps to assist a user in positioning system 770 or retaining system 770 in a desired position, or other tools.

FIG. 7 also illustrates other aspects of the disclosure. In some embodiments, the entirety of half 700 or 700' may be formed of a homogeneous material. The homogeneous material may be a thermoplastic elastomer. In some embodiments, the homogeneous material includes a thermochromic pigment throughout. In some embodiments, the thermochromic pigment is included within a thermoplastic elastomer that has a base color due to a conventional dye or other suitable coloring agents, but other base materials are used in other embodiments. In other embodiments, the homogeneous material includes two or more thermochromic pigments. In some embodiments, only base 736 or 736' is formed of the homogeneous material. In some embodiments, only protrusions 701, 701' are formed of the homogeneous material and in some embodiments, all of the protrusions 701, 701' and base 736, 736' are formed of the homogeneous material.

In other embodiments, the thermoplastic elastomer material used to make system 770, may include thermochromic pigments in discrete areas. For example, referring to mat 700, regions 740 may include a particular thermochromic pigment whereas regions 750 may include a different thermochromic pigment. In some embodiments, one of regions 740, 750 includes one or more thermochromic pigments and the other of the regions 740, 750 contains no thermochromic pigment. In some embodiments, one of regions 740, 750 includes one thermochromic pigment and the other of the regions 740, 750 contains more than one thermochromic pigment. FIG. 7 also shows discrete regions 740' and 750' in a different arrangement on mat 700'. Each of discrete regions 740' and 750' may include one or more thermochromic pigments and the thermochromic pigment or pigments in region 740' may be different than the thermochromic pigment or pigments in region 750' in some embodiments, one of discrete regions 740' and 750' include one or more thermochromic pigments and the other does not. In each of the aforedescribed regions 740, 750, 740' and 750' the thermochromic pigment may be disposed within the respective protrusions 701, 701', the respective base 736, 736' or both the protrusions and the base. When different thermochromic pigments are used, they are chosen for having different color transition temperatures.

It should be understood that FIG. 7 is merely illustrative of the feature that the mats 700, 700' or any of the mats illustrated in the other figures, may include one or more thermochromic pigments homogeneously throughout the device, only in the mat, only in the protrusions, or the mats may include different regions, i.e. regions that are void of thermochromic pigments and regions that include different thermochromic pigments than other regions and this is applicable to all described embodiments.

FIG. 8 depicts one embodiment of system 880 having two halves 800, 800'. Each illustrated half 800, 800' has an array 810, 810' of cone shaped protrusions 801, 801'. As depicted in FIG. 8, halves 800, 800' may be symmetric and each may have an elongated shape such as oval or rectangular. Other shapes for the base of a portable mat may also be possible. In some embodiments, halves 800, 800' may be complementary, identical, asymmetric, or mirrored. Halves 800, 800' may be shaped to maximize the number of protrusions 801, 801' in contact with the thighs or buttocks of a seated user. As depicted in FIG. 8, halves 800, 800' may have two edges that are substantially straight and substantially orthogonal to one another and an edge that has a curvature based on a profile of a user's buttocks and thighs. Having an edge that is substantially straight allows a user to position halves 800, 800' in a "V" or modified "V" configuration in which both halves 800, 800' are positioned relative to a single limb of a user to treat a greater surface area of the limb, or in which both halves 800, 800' are positioned on the outside of each thigh or buttock. Having an edge that is curved may allow a user to conform each half 800, 800' to optimize contact with protrusions 801, 801' or to avoid contact with protrusions 801, 801'. System 880 may form part of a kit (not shown), which may also include a carrying case, cleaning materials, belts or straps to assist a user in positioning system 880 or retaining system 880 in a desired position, or other tools.

Embodiments may include other variations as well. FIG. 9 depicts one embodiment of system 980 having bases 920, 920', each of which may constitute half of a kit (not shown). Base 920, 920' may have respective arrays 910, 910' of pointed protrusions 901, 901'. As depicted in FIG. 9, base 920, 920' may be circular, and pointed protrusions 901 may be semispherical, angular, or conical. Those skilled in the art will appreciate that other shapes or combinations of shapes may also be possible.

In some embodiments, devices and systems described above may be attached together for transport or storage. In some embodiments, devices and systems may attach together for transport, storage or use. A connection between two devices, bases, etc., may include a fixed connection, a hinged connection, or some other form of connection. A connection may be permanent, or devices, bases, etc., may be connected and separated as desired. Advantageously, the ability to separate components or modify configurations may allow embodiments to treat people having various body types, weights, etc.

These, and other, aspects of the disclosure and various features and advantageous details thereof are explained more fully with reference to the exemplary, and therefore non-limiting, embodiments illustrated and described herein. It should be understood, however, that the detailed description and the specific examples, while indicating some embodiments, are given by way of illustration only and not by way of limitation. For example, in some embodiments, a portable mat may have two pads of the same or similar shape and size attached along a length of the mat such that the pads can fold up to form a carrying case for items, including but not limited to a laptop, paperwork, or magazines. As another example, in some embodiments, a portable mat may have two halves connected with a flexible material that allows the two halves to be placed in various but limited arrangements and distances in relation to each other.

Furthermore, descriptions of known materials and manufacturing techniques may be omitted so as not to unnecessarily obscure the disclosure in detail. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the accompanying appendices, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and in the accompanying appendices, the meaning of "in" includes "in" and "on" unless the context clearly dictates otherwise. The scope of the present disclosure should be determined by the following claims and their legal equivalents.

What is claimed is:

1. A mat configured for causing non-transdermal temporary indentation in the flesh of a user by concentrating pressure on localized points on the flesh during low energy, sustained contact when the mat is in use, said mat comprising:
   a base and a plurality of protrusions protruding from a first surface of the base;
   wherein the base and the plurality of protrusions are formed of a thermoplastic elastomer material including at least a thermochromic pigment that changes color at an associated temperature,
   each of the plurality of protrusions consisting of a square pyramid shape, each edge between triangular side faces of said square pyramid shape being beveled, each of the plurality of protrusions contiguous with at least one other of the plurality of protrusions on the first surface of the base, each protrusion of the plurality of protrusions having a blunt tip configured for causing said non-transdermal temporary indentation when in use, wherein the beveled edges are each uniformly beveled from said first surface to said tip.

2. The mat as in claim 1, wherein the edges of each of the protrusions have a first slope near the base and a second, lesser slope near the blunt tip and the beveled edges are uniformly beveled from the first surface to the blunt tip.

3. The mat as in claim 1, wherein the thermochromic pigment changes from a darker color to a lighter color with a temperature increase.

4. The mat as in claim 1, wherein the thermoplastic elastomer has a base color and the thermochromic pigment changes from a colored version to a colorless version when the temperature of the mat exceeds a predetermined temperature.

5. The mat as in claim 1, wherein the mat changes from a darker color to a lighter color when the temperature of the mat exceeds a predetermined temperature.

6. The mat as in claim 1, wherein the at least a thermochromic pigment comprises two thermochromic pigments that change colors at different temperatures.

7. The mat as in claim 6, wherein the two thermochromic pigments are homogeneously present throughout the thermoplastic elastomer material.

8. The mat as in claim 6, wherein a first of the two thermochromic pigments is present only in a first region of the mat and a second of the two thermochromic pigments is present only in a second region of the mat.

9. The mat as in claim 1, wherein the thermoplastic elastomer has a base color and the thermochromic pigment comprises a Leuco dye.

10. The mat as in claim 1, wherein the thermochromic pigment changes temperature within the range of 83-96° F.

11. The mat as in claim 1, wherein the thermoplastic elastomer has a base color, the thermochromic pigment is homogeneously present throughout the thermoplastic elastomer material and the thermochromic pigment comprises a Leuco dye or thermochromic liquid crystals.

12. The mat as in claim 1, wherein the protrusions of the plurality of protrusions have a height that tapers from a first height at a first edge of the base to a second height at a second edge of the base, the first height being greater than the second height.

13. The mat as in claim 1, wherein the thermoplastic elastomer material has a thermal conductivity between 0.04-0.52 $W*m^{-1}*K^{-1}$.

14. The mat as in claim 1, wherein the thermochromic pigment comprises a Leuco dye which changes color in a range of about 83-96° F.

15. A kit configured for causing non-transdermal temporary indentation in the flesh of a user by concentrating pressure on localized points on the flesh during low energy, sustained contact when in use, the kit comprising a portable mat according to claim 1, a case for storing and transporting said portable mat.

16. A system configured for causing non-transdermal temporary indentation in the flesh of a user by concentrating pressure on localized points on the flesh during low energy, sustained contact when in use, the system comprising:
   a set of mats, each said mat comprising a base and a plurality of protrusions protruding from a first surface of the base, at least one of the base and the plurality of protrusions formed of a material including at least a thermochromic pigment that changes color at an associated temperature, each of the plurality of protrusions consisting of a square pyramid shape, each edge between triangular side faces of said square pyramid shape being beveled, each of the plurality of protrusions contiguous with at least one other of the plurality of protrusions on the first surface of the base, each protrusion of the plurality of protrusions having a blunt tip configured for causing non-transdermal temporary indentation when in use, wherein the beveled edges are each uniformly beveled from said first surface to said tip.

17. The system as in claim 16, wherein the thermochromic pigment changes color within the range of 83-96° F., each of said base and said plurality of protrusions are formed of said material, and said material includes a thermoplastic elastomer material.

18. The system as in claim 16, wherein the thermochromic pigment comprises a Leuco dye or thermochromatic liquid crystals, the material comprises a thermoplastic elastomer material.

* * * * *